Nov. 6, 1928.
E. R. GEDGE
1,691,024
WAX DISTRIBUTING FLOOR POLISHER
Filed Dec. 8, 1925
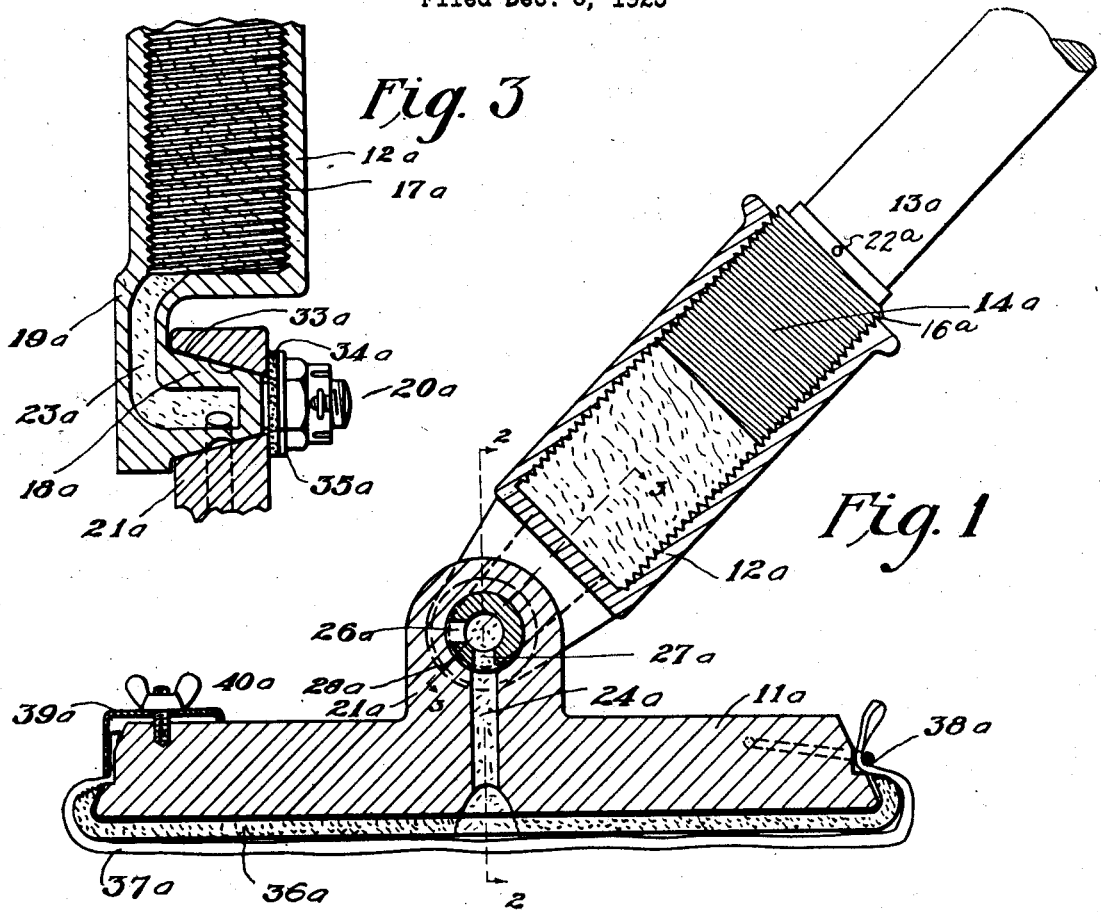
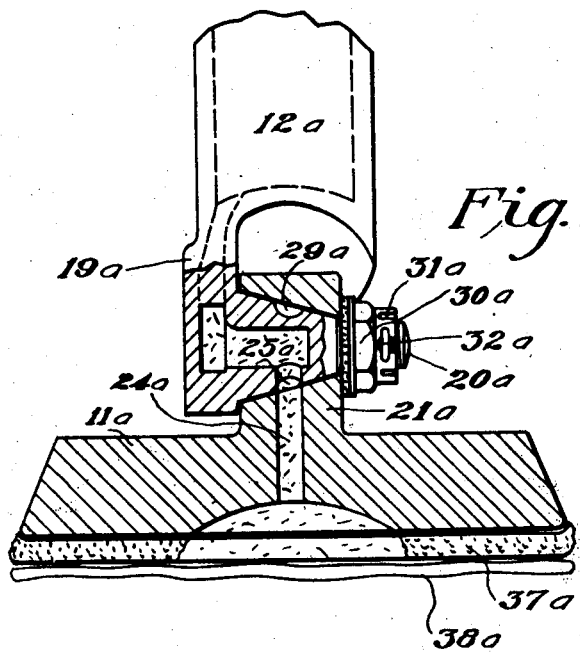
INVENTOR
Edna R. Gedge
By Maurice L. A. Graham
ATTORNEY Patented Nov. 6, 1928.

1,691,024

UNITED STATES PATENT OFFICE.

EDNA R. GEDGE, OF LOS ANGELES, CALIFORNIA, ASSIGNOR TO PEERLESS PRODUCTS COMPANY, A CORPORATION OF CALIFORNIA.

WAX-DISTRIBUTING FLOOR POLISHER.

Application filed December 8, 1925. Serial No. 74,083.

As may be inferred from the above designation, the objects of this invention are similar to those set forth in my copending application, Serial No. 731,774, filed August 13, 1924, upon which the organization herein described presents a marked improvement from a manufacturing standpoint.

As in the former case mentioned, it is an object of this invention to provide a floor-conditioning tool with a wax container which is connected both with a handle and with a weight through and by which wax may be applied to a floor; and a preferred embodiment of my present invention may comprise a weight having a channeled and transversely apertured upstanding lug or lugs by which a wax container is pivotally connected thereto. This wax container may have threaded connection with a thimble, or the like, secured upon or integral with a handle,—the construction here referred to being such that a rotation of the handle, or a rotation of the thimble upon the lower end thereof, or a relative rotation of the mentioned weight, is effective to press wax downwardly from said container and through the mentioned cavity in the weight at the lower end thereof, the wax so fed being preferably delivered into a duct or ducts opening through the bottom of said weight; and, if desired, a circumferential groove upon a conical connecting head may optionally be so interrupted as to provide means for preventing a downward flow of wax, or the like, when the mentioned handle is held in a predetermined position, as a vertical position.

In the present embodiment of my invention, instead of providing the mentioned weight with a central cavity adapted to receive a cylindrical head, although I use a weight similar to that referred to in my mentioned prior application, and a wax container which is preferably disposed coaxially with a handle—of which it may form a part or continuation—in order to facilitate manufacture and assembly, and in order to improve the durability and the reliability of the device, preferably employing a single channeled upstanding lug or projection disposed centrally on the back of the mentioned weight, I may utilize a transverse conical aperture therethrough (interfitting with the corresponding channeled conical projection on said chamber element) pivotally to connect said chamber and handle with said weight.

Other objects of my invention may be best appreciated from the following description of an illustrative embodiment thereof, taken in connection with the appended claims and the accompanying drawings, in which—

Fig. 1 is a longitudinal section in a median plane.

Fig. 2 is a transverse section, taken substantially as indicated by the line 2—2 of Fig. 1.

Fig. 3 is a detail view, taken substantially as indicated by the line 3—3 of Fig. 1.

Referring to the details of that specific embodiment of my invention chosen for purposes of illustration, 11$^a$ may be the weight or main body of my floor conditioning tool, this element being comparatively heavy and provided with a substantially flat bottom; and 12$^a$ may be a wax container pivotally connected thereto and surrounding the lower end of a handle 13$^a$. The latter is shown as co-axially disposed and as connected to said container by means of a threaded thimble 14$^a$, having external threads 16$^a$, which are adapted to engage suitable threads 17$^a$ upon the interior of the container 12$^a$. The container 12$^a$ may be connected to the weight 11$^a$, or its equivalent, by means such as a cored conical bearing projection or head 18$^a$, shown as having an offset neck 19$^a$ and as integral with said chamber and with a threaded extension 20$^a$,—the end member extending through a central upstanding lug 21$^a$ upon the weight 11$^a$.

The weight 11$^a$ may be provided with a duct or ducts through which wax, or the like, may be pressed by the relative rotation of the handle 13$^a$, or the thimble 14$^a$. In order that, upon such relative rotation (the handle 13$^a$ and the thimble 14$^a$ being optionally secured together by means such as a pin 22$^a$) wax may be reliably delivered in a completely controllable manner downward through a duct 23$^a$ in the offset neck 19$^a$, or its equivalent, and therefrom into a passage or passages 24$^a$ leading from the upstanding projection or lug 21$^a$ through the bottom of the weight 11$^a$. I show the conical projection 18$^a$ as provided with a circumferential groove 25$^a$,— which may communicate with the duct 23$^a$ by one or more lateral openings of the general character shown at 26$^a$ and 27$^a$. These openings may be spaced apart by an angle of about 90°, and adapted to be brought actually opposite the passages 24ª whenever the handle 13ª is inclined in a manner suitable to the use of the described organization; and, if desired, the circumferential groove 19ª may be interrupted in the region 28ª, in order to provide what I may term a valve, closing the passage 24ª whenever and so long as the handle 13ª is kept upright,—as during a storage of the described organization in a closet, or elsewhere.

The lug or projection 21ª being shown as provided with a conical seat or passage 29ª to receive the correspondingly formed projection 18ª, the mentioned interfitting parts may be secured together by means such as a turreted nut 30ª, engaging the threaded extension 20ª, and, as shown, the cooperating nut and extension may also be respectively provided with notches 31ª and a passage for the reception of a cotter pin 32ª, or its equivalent. This permits a take-up to compensate for wear; and it is an important merit of the described construction, that, although a good fit is desirable in the region to which I have applied the reference character 33ª, the interposition of a resilient felt or composition washer 34ª (shown as secured by a metal washer 35ª) may be relied upon to prevent leakage past the smaller end of the conical head 18ª, or its equivalent.

It will be obvious that any desired wax may be used in the chamber 12ª, or its equivalent; and that a suitable felt 36ª and a cloth 37ª, or the equivalents of these, may be retained by any preferred means,—as by a wire loop 38ª and a clip 39ª,—the latter being shown as adjustable by a thumb screw 40ª.

When my polisher is used in the waxing of floors, it will be understood that a slight relative rotation between the mentioned handle or thimble and the wax container is invariably effective to deliver a small quantity of wax through the passage or passages 24ª; and when desired, polishing may then be effected, in a known manner, by the reciprocation of the weight carrying the described felt and/or cloth,—the latter being replaceable at will; and it will be understood that, as indicated in my mentioned prior application, the described organization may be used for alternative effects, as for an abrading effect in which the cloth 37ª may be replaced by emery paper or cloth.

Although I have herein described a single complete embodiment of my invention, it should be understood that various features thereof might be independently employed, and also that numerous modifications might be devised, by those skilled in the art to which this case relates, without involving the slightest departure from the spirit and scope of my invention, as the same is indicated above and in the following claims.

I claim as my invention:

1. In a floor waxer, a fabric-carrying weight having a substantially flat bottom; a wax container pivotally connected with said weight; a handle secured to said wax container and provided with means for ejecting wax therefrom; and means permitting a flow of wax directly from said wax container to and through said weight, said container is pivotally connected with said weight by means of interfitting parts having conical surfaces.

2. In a floor waxer, a fabric-carrying weight having a substantially flat bottom; a wax container pivotally connected with said weight; a handle secured to said wax container and provided with means for ejecting wax therefrom; and means permitting a flow of wax directly from said wax container to and through said weight, said container is pivotally connected with said weight by means of interfitting parts having conical surfaces, one of said parts being a conical head which is connected with said container by an offset neck.

3. In a floor waxer, a fabric-carrying weight having a substantially flat bottom; a wax container pivotally connected with said weight; a handle secured to said wax container and provided with means for ejecting wax therefrom; and means permitting a flow of wax directly from said wax container to and through said weight, said container being pivotally connected with said weight by means of interfitting parts having conical surfaces, one of said parts being a conical head which is connected with said container by an offset neck, said head being secured in a lug on said weight by means comprising a nut engaging a threaded extension of said head.

In testimony whereof, I have hereunto set my hand at Los Angeles, California, this 3rd day of December, 1925.

EDNA R. GEDGE.